United States Patent [19]
Greck

[11] 3,747,738
[45] July 24, 1973

[54] ARTICLE HANDLING SYSTEM
[75] Inventor: Eugene Greck, Westfield, N.J.
[73] Assignee: American Flange & Manufacturing Co. Inc., New York, N.Y.
[22] Filed: Sept. 18, 1970
[21] Appl. No.: 73,600

Related U.S. Application Data
[62] Division of Ser. No. 760,166, Sept. 17, 1968, abandoned.

[52] U.S. Cl. .......................................... 198/33 AA
[51] Int. Cl. ........................................... B65g 47/24
[58] Field of Search ................. 198/33 AA; 221/10; 302/2 R, 52

[56] References Cited
UNITED STATES PATENTS
3,615,151   10/1971   Sterling .......................... 198/33 AA
3,330,403   7/1967    Roberts ........................... 198/33 AA
3,387,695   6/1968    Hendrickson ................. 198/33 AA
2,337,667   12/1943   Kuehlman ............................ 221/10
3,086,822   4/1963    Fibish ......................... 198/33 AA X Primary Examiner—Edward A. Sroka
Attorney—Albert M. Parker

[57] ABSTRACT

A pneumatic conveyor transfers articles from a floor mounted bulk storage bin to an elevated feeding and orienting hopper. The articles are automatically dispensed from the bulk storage bin into an entrance chute on the pneumatic conveyor. At an elevated conveyor discharge station the articles are dropped into the feeding and orienting hopper which includes means for sensing the article supply and activating the dispensing means on demand.

2 Claims, 5 Drawing Figures

Patented July 24, 1973  3,747,738

INVENTOR
EUGENE GRECK
BY
Albert M. Parker
ATTORNEY

INVENTOR
EUGENE GRECK
BY Albert M. Parker
ATTORNEY

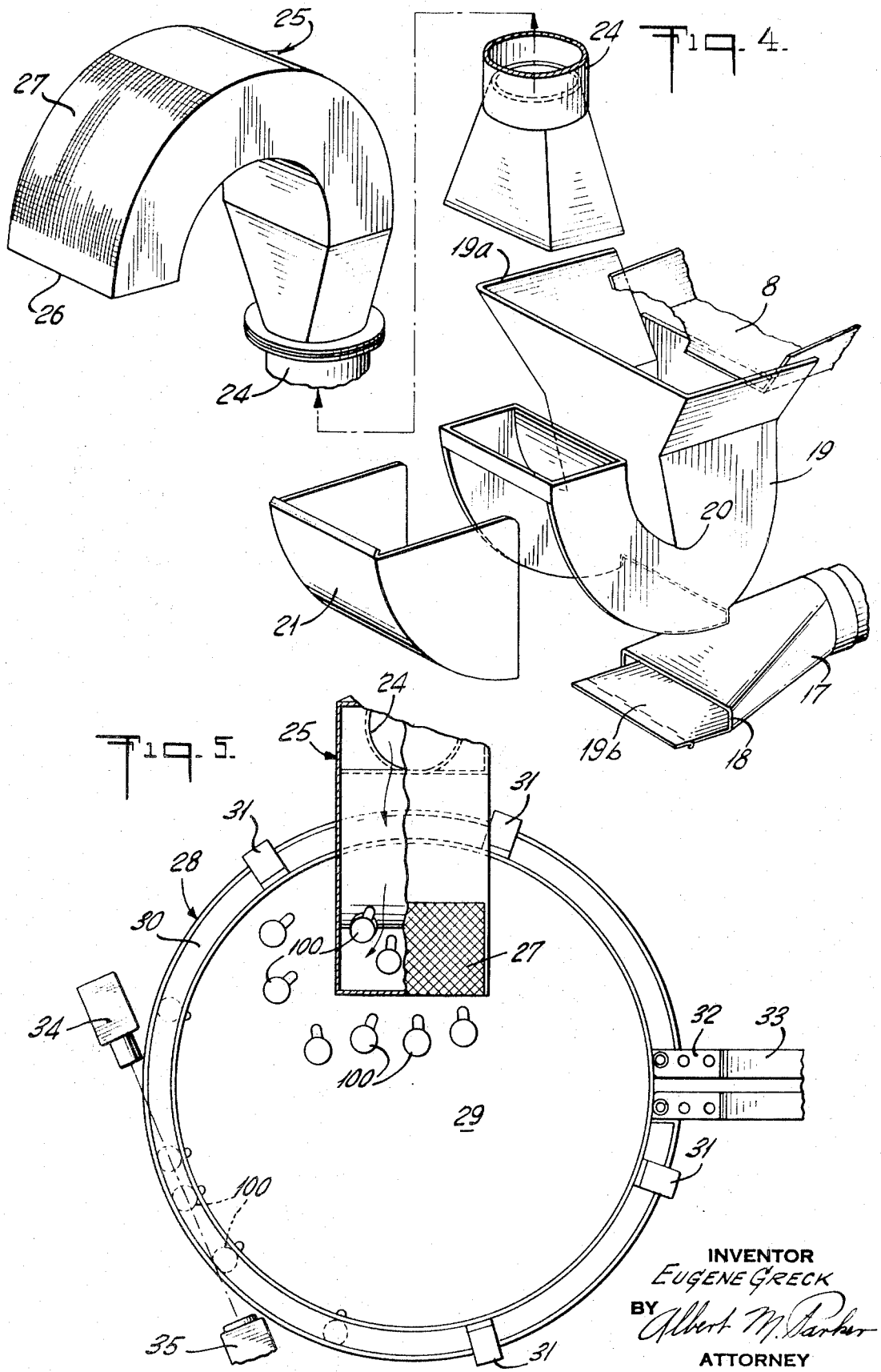

ARTICLE HANDLING SYSTEM

This is a division of application Ser. No. 760,166, filed Sept. 17, 1968 now abandoned.

This invention relates to a method and apparatus for handling articles and is particularly concerned with an integrated system for continuously supplying articles from a floor mounted bulk storage bin to an elevated feeding and orienting hopper.

The article handling system of this invention has answered a need arising in the container closure field wherein the increasing efficiency of closure manufacturing and applying operations has necessitated the development of an improved closure handling system, the basic function of such system comprising the conveying of closure caps from floor level to an elevated hoppering station. Mechanical conveyors useable for this purpose are slow, cumbersome and, due to the presence of moving parts, prone to jamming. Moreover the mechanical conveyor is not very well suited for supplying articles upon demand characterized by appreciable fluctuation. Frequent product changeover such as from one lithography design to another also renders the mechanical conveyor undesirable in many situations due to the time consuming, cleaning out operation involved to insure against any mixing of design lots.

The article handling system of the invention improves over known mechanical arrangements by employing a unique pneumatic conveyor for effectively elevating the closure caps to the hoppering station. The method and apparatus herein disclosed avoid the above mentioned prior art deficiencies in metering the closure caps out of the floor mounted bulk storage bin into the pneumatic conveyor entrance by means of an underslung vibratory feed pan. The caps mixed with air moving at a predetermined velocity are blown up to an elevated position whereupon the caps are separated from the moving air stream and gently dropped into a feeding and orienting hopper. A supply sensing device in the hopper activates the vibratory feed pan so that caps are instantaneously fed to the hopper on demand.

It is accordingly a primary object of this invention to provide an improved article handling system.

Another object is to provide an improved method of handling articles.

A further object is to provide an improved method and apparatus for conveying articles from a bulk storage supply source to an elevated article orienting station.

A still further object is to provide a method and apparatus for pneumatically conveying closure caps.

Further and more detailed objects will in part be obvious and in part pointed out as the description of the invention, taken in conjunction with the accompanying drawing proceeds.

In that drawing:

FIG. 3 is a cross sectional elevation view taken on line 3—3 of FIG. 2;

FIG. 4 is an exploded view showing part of the pneumatic conveyor of the invention; and FIG. 5 is a top plan view of the article discharge station showing the hopper and the discharge section of the conveyor with parts broken away for clarity.

Figure 1:
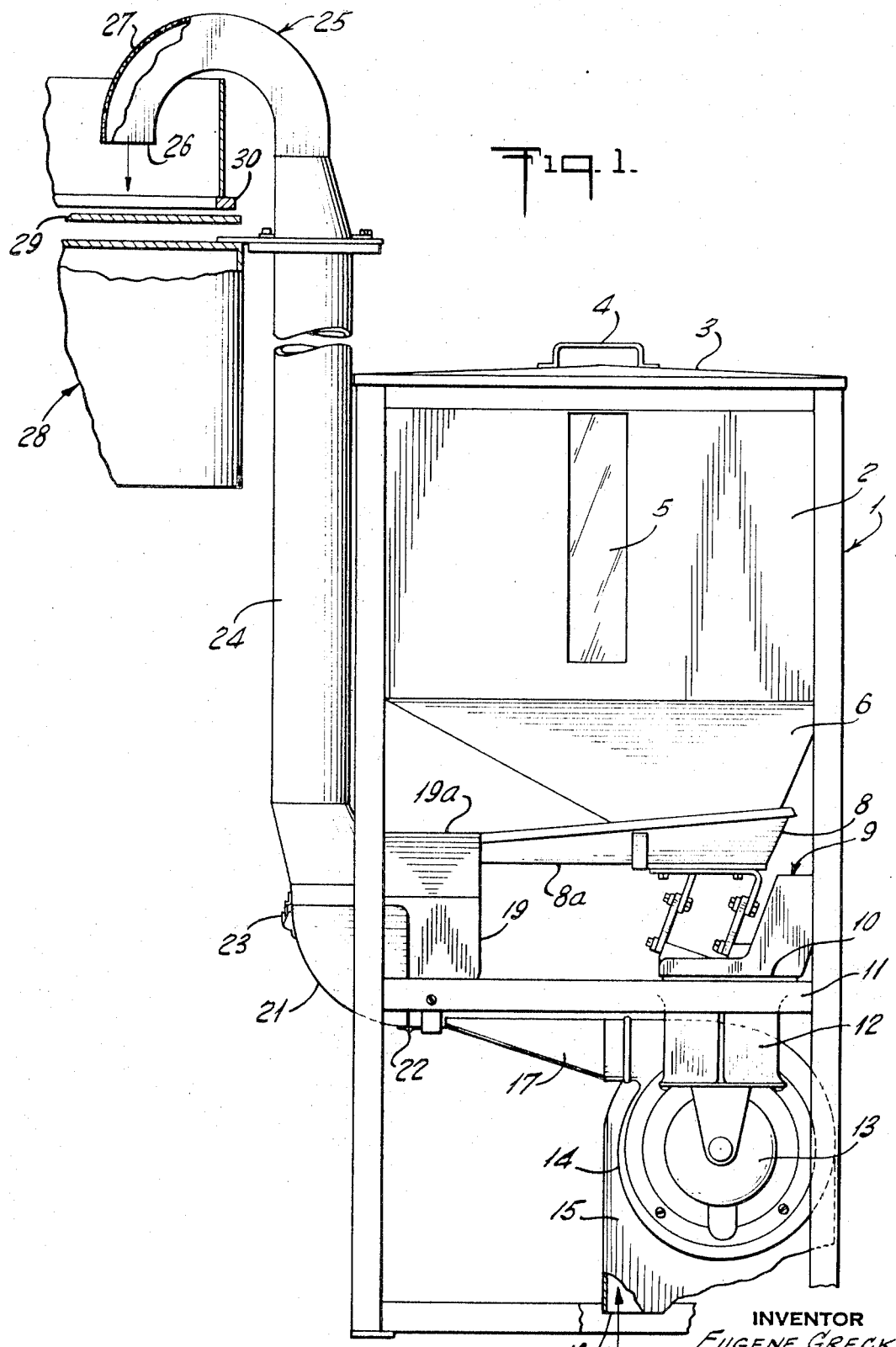
FIG. 1 is a side elevational view of the article handling apparatus of the invention and for carrying out the method thereof.
Figure 2:
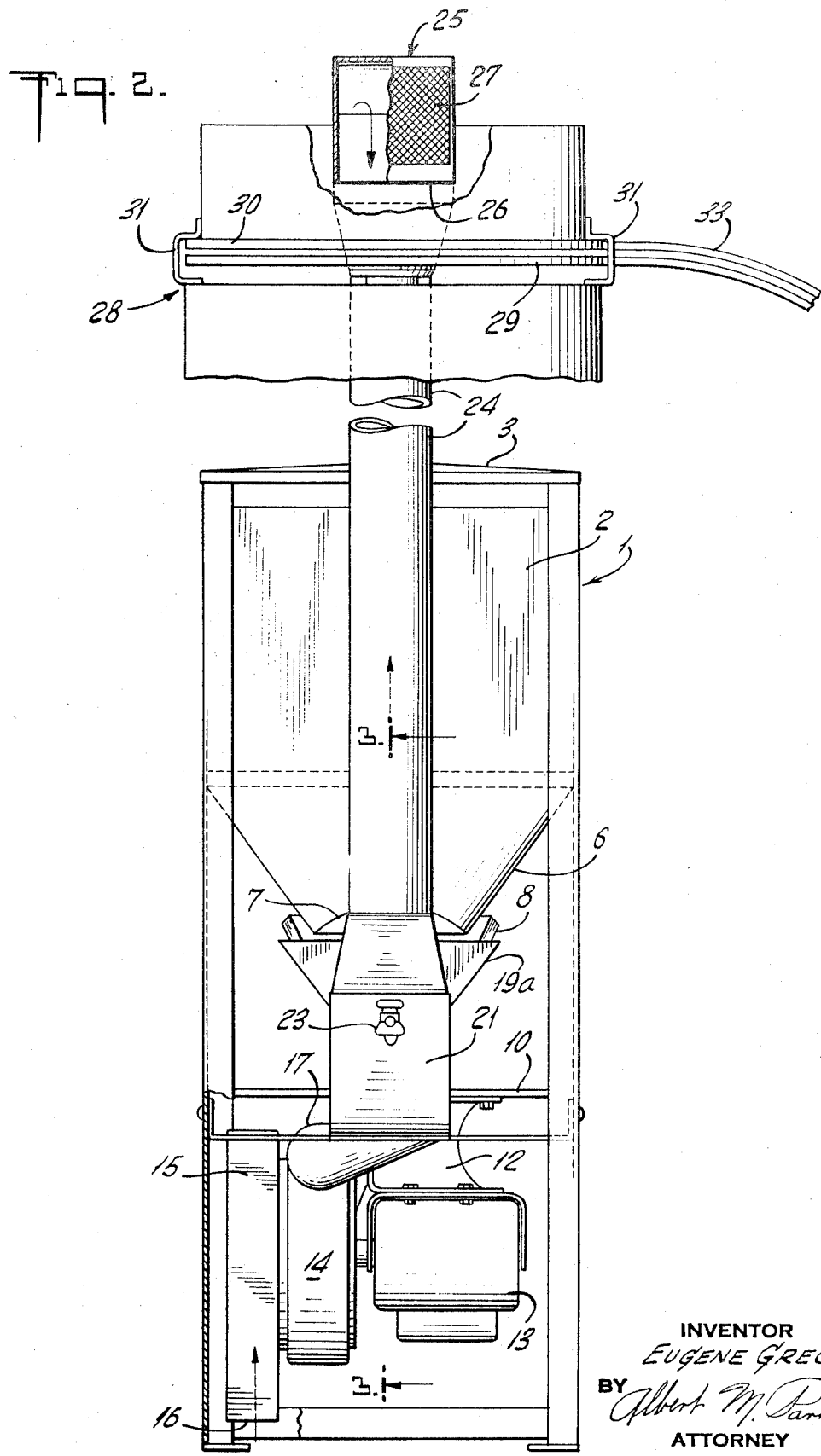
FIG. 2 is an end elevational view of the apparatus of FIG. 1.
Figure 2:
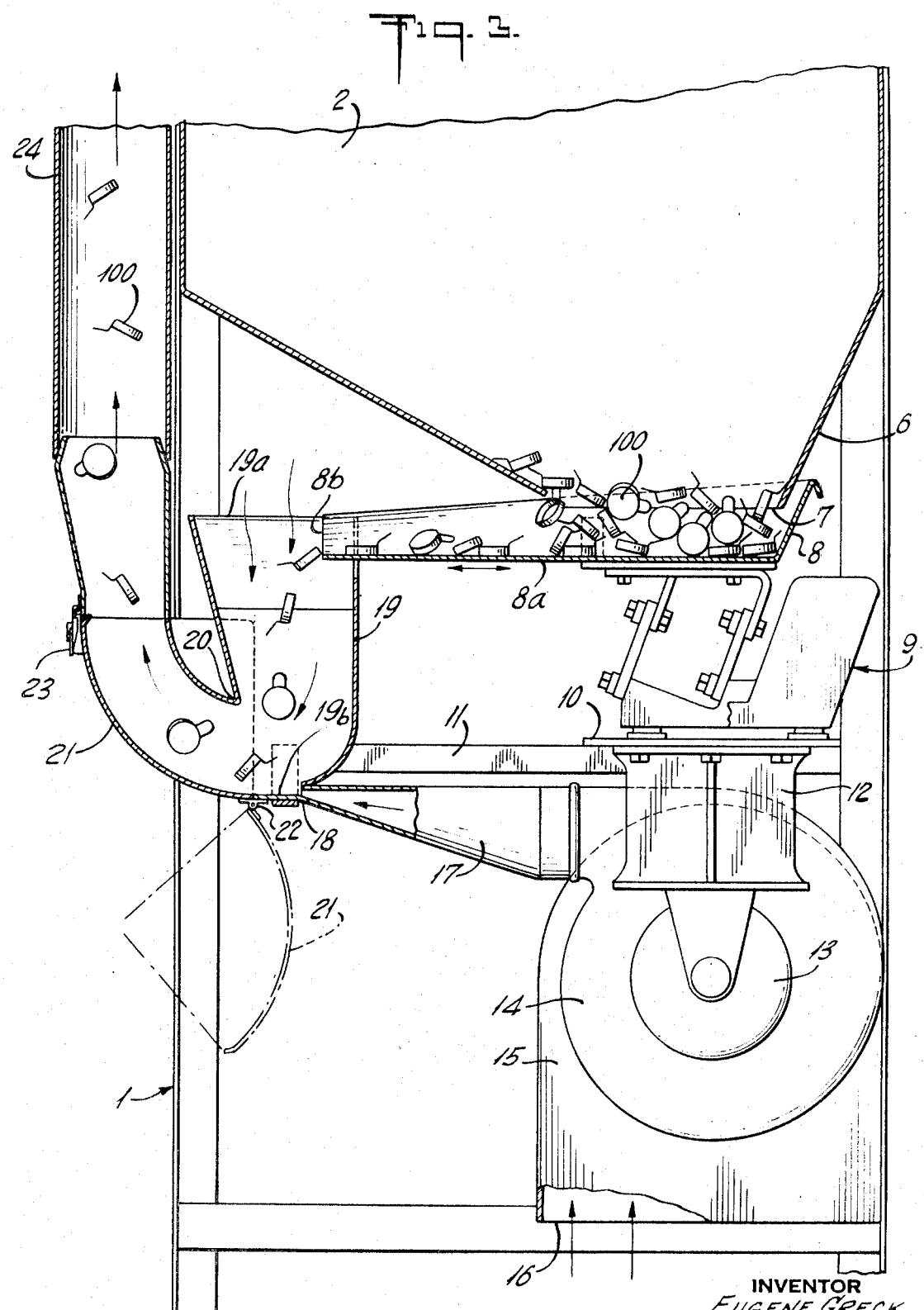

Considering first the portion of the article handling system which is mounted at floor level, FIGS. 1, 2 and 3 show an upright frame generally indicated at 1. A bulk storage bin 2 is mounted within the upper section of the frame 1 and is provided with a top lid 3 having a handle 4. A viewing window 5 is also provided in a sidewall of the bin 2 for readily determining the article level within. The bin 2 is formed with a funnel shaped bottom section 6 which terminates in a lowermost discharge opening 7. A vibratory feed pan 8 is horizontally disposed beneath the bin opening 7 into which the articles 100 are deposited. As seen in FIGS. 1 and 3, a standard vibrator unit 9 is attached to the bottom 8a of the feed pan 8 and rigidly mounted on a plate 10 which is in turn supported by the frame braces 11. A motor mounting bracket 12 is also attached to the plate 10 for supporting a motor 13 with its drive shaft horizontally disposed. The motor 13 is arranged to drive a blower unit 14 which is joined to an air intake housing 15. A downwardly opening air intake portion 16 is provided at the bottom of the housing 15 and an air filter (not shown) is mounted within the housing to assure the entrance of clean air to the blower.

The blower 14 forces air into the circular end of a transition conduit member 17 which tapers the air passage down to a restricted opening 18. The transition conduit member 17 is connected to the bottom of a vertically oriented article receiving chute 19 having an outwardly flared upper end 19a into which the open end 8b of the vibratory pan 8 extends. As clearly seen in FIG. 3 the restricted opening 18 of the transition conduit 17 is disposed in a vertical plane causing the air from the blower to be directed horizontally across the bottom wall 19b of the chute 19. Directly opposing the air opening 18 and spaced laterally therefrom is a conduit opening 20 into which the article and air mixture is blown.

A lowermost upwardly curved conduit portion 21 extends from the opening 20 and also acts as a clean out door hingedly mounted at 22 and provided with a suitable latch mechanism 23. A conduit extension 24 extends for the desired length above the curved portion 21. A downwardly curved article discharge section 25 is clamped to the upper end of the conduit extension 24 and terminates in a downwardly facing discharge opening 26. As seen in FIGS. 2 and 4, the discharge section 25 is provided with an outwardly facing wire screen portion 27 adjacent the opening 26.

An article orienting and feeding hopper, generally indicated at 28, is mounted at an elevated position to receive the end of the discharge section 25. As seen in FIGS. 2 and 5, the hopper 28 includes a horizontally disposed turntable 29 onto which the articles 100 are directly discharged. An orienting rail 30, supported by brackets 31, overlies and is vertically spaced from an annular zone adjacent the periphery of the turntable 29. The orienting rail 30 is interrupted by an article exit 32 which directs the oriented articles into an exit chute 33. A light source 34 and photo electric cell 35 are arranged to form a light circuit extending horizontally for a distance within the space between the rail 30 and the turntable 29 so that the circuit is interrupted by the passage of oriented articles extending beneath the rail 30. The photo electric cell 35 is electrically connected to the vibrator 9 so as to activate the same upon completion of the light circuit.

In operation a quantity of bulk packed articles 100 are dumped into the floor mounted bulk storage bin 2. In the form of the invention disclosed, the articles handled are closure caps having a cupped body and a laterally extending gripping ear. As seen in FIG. 3 a column of cap articles is formed between the bin discharge opening 7 and the vibratory pan 8. Actuation of the vibrator 9 causes articles 100 to shift away from the column and be conveyed along the path bottom 8a toward the open end 8b. During this conveying the articles become relatively evenly distributed across the pan bottom 8a. The resulting movement and distribution imparted to the articles by the vibratory pan causes a kind of dribbling action as the articles fall from the pan end 8b into the flared end 19a of the receiving chute 19. This dribbling or metering action, as distinguished from dumping large quantities at a time into the chute 19, allows a sufficient quantity of air to be blown into the conduit 20 to prevent clogging of articles at the bottom of the chute.

Air moving at accelerated velocity is directed, through the restricted opening 18, across the bottom wall 19b of the chute 19 into the conduit opening 20 laterally spaced therefrom. The resulting decrease in pressure in the chute 19 aids in drawing the articles and additional air down into the bottom of the chute 19. The article air mixture is then blown through the curved conduit section 21 and up the conduit extension 24. Upon reaching the top of the curved discharge section 25 the articles 100 are deflected downwardly toward the discharge opening 26. However, the air which acts as a conveying medium is permitted to escape through the wire screen 27 leaving the articles to fall primarily under the influence of gravity alone into the hopper 20. This separation of the air from the articles prior to their discharge from the opening 26 eliminates the turbulence and other undesirable and/or damaging effects of blowing the articles directly onto the turntable 29.

The articles are then swept, under the influence of a centrifugal force, to the periphery of the turntable 29 where properly facing cap articles slide under the rail 30 and have their ears properly oriented inwardly along radial lines as the articles are conveyed in a circular path to the exit 32. The articles are then fed down the exit chute 33 to any subsequent operation such as bottle capping.

When the supply of articles in the hopper becomes low, a gap will occur in the line of articles being fed under the rail 30. When such a gap moves between the light source 34 and the photo electric cell 35 the light circuit is completed and the vibrator 9 is activated causing additional articles as required to be fed into the chute 19. When the bulk supply bin 2 becomes low as indicated by the level of articles therein as viewed through the window 5 it can be easily and conveniently refilled by an operator at floor level.

The pneumatic conveyor article handling system herein disclosed is particularly suited for relatively high speed operations in that the hopper is instantaneously resupplied upon signaling of the photo electric cell for more articles. The pneumatic conveyor described also possesses a desirable instantaneous, self cleaning feature which greatly aids in the changeover from one lot of articles to another such as in the case of cap articles carrying different lithography designs. Finally, not to be overlooked is the much greater installation flexibility and the substantial saving in fabrication of the invention system as compared to more cumbersome mechanical conveyor arrangements.

Having described my invention, what I claim as new and desire to secure by Letters Patent is:

1. The method of conveying closure caps comprising dumping randomly oriented closure caps into a bulk supply, withdrawing limited quantities of closure caps from said bulk supply, intermittently dispensing said withdrawn closure caps in a controlled manner, introducing said bulk dispensed closure caps under the influence of gravity into a restricted closure cap conveying passage, decreasing the air pressure in said passage, accelerating said closure caps away from said path, applying a continuous upwardly directed uniformly applied force to said closure caps, conveying said closure caps to an elevated location, releasing said closure caps from the influence of said force, properly orienting said released closure caps, feeding said oriented closure caps to a subsequent work station, sensing the presence of oriented closure caps in feeding position and controlling said closure cap dispensing through said sensing.

2. The method as in claim 1 wherein said withdrawing is controlled by said sensing.

* * * * *